United States Patent
Onishi

(10) Patent No.: US 8,682,642 B2
(45) Date of Patent: Mar. 25, 2014

(54) TRANSLATION DISPLAY APPARATUS

(75) Inventor: Satoshi Onishi, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 240 days.

(21) Appl. No.: 13/281,662

(22) Filed: Oct. 26, 2011

(65) Prior Publication Data
US 2012/0116750 A1    May 10, 2012

(30) Foreign Application Priority Data

Nov. 10, 2010  (JP) ............... P2010-252332
Apr. 19, 2011  (JP) ............... P2011-093200

(51) Int. Cl.
*G06F 17/28* (2006.01)
(52) U.S. Cl.
USPC .................. 704/3; 704/2; 704/277
(58) Field of Classification Search
USPC ............ 704/1–10, 251, 252, 255, 257, 277, 704/270, 270.1; 382/229
See application file for complete search history.

(56) References Cited

U.S. PATENT DOCUMENTS

| 7,865,353 B2 * | 1/2011 | Koyama et al. ............ 704/3 |
| 8,260,064 B2 * | 9/2012 | Konno ...................... 382/229 |
| 2002/0109687 A1 | 8/2002 | Ishii et al. |
| 2006/0217954 A1 | 9/2006 | Koyama et al. |
| 2011/0224967 A1 * | 9/2011 | Van Schaik ............... 704/2 |

FOREIGN PATENT DOCUMENTS

| CN | 1838112 A | 9/2006 |
| JP | 4-311262 | 11/1992 |
| JP | 7-121539 | 5/1995 |
| JP | 7-182348 | 7/1995 |
| JP | 2002-215281 | 7/2002 |
| JP | 2007-249482 | 9/2007 |
| JP | 2009-080727 | 4/2009 |
| JP | 2009-217428 | 9/2009 |

* cited by examiner

*Primary Examiner* — Huyen X. Vo
(74) *Attorney, Agent, or Firm* — Nixon & Vanderhye, P.C.

(57) ABSTRACT

In a translation display apparatus, when an instruction to enlarge and display a part of an image of a translated sentence-added document displayed on a display unit is inputted from a display instruction input section, a partially-enlarged image creating section creates a partially-enlarged image in which a part of the image of a translated sentence-added document is enlarged. Under the control of a control section, an image creating section creates a partial enlargement-added image which is an image obtained by superimposing the partially-enlarged image created by the partially-enlarged image creating section on the image of the translated sentence-added document. Under the control of the control section, the display unit displays the partial enlargement-added image.

4 Claims, 5 Drawing Sheets

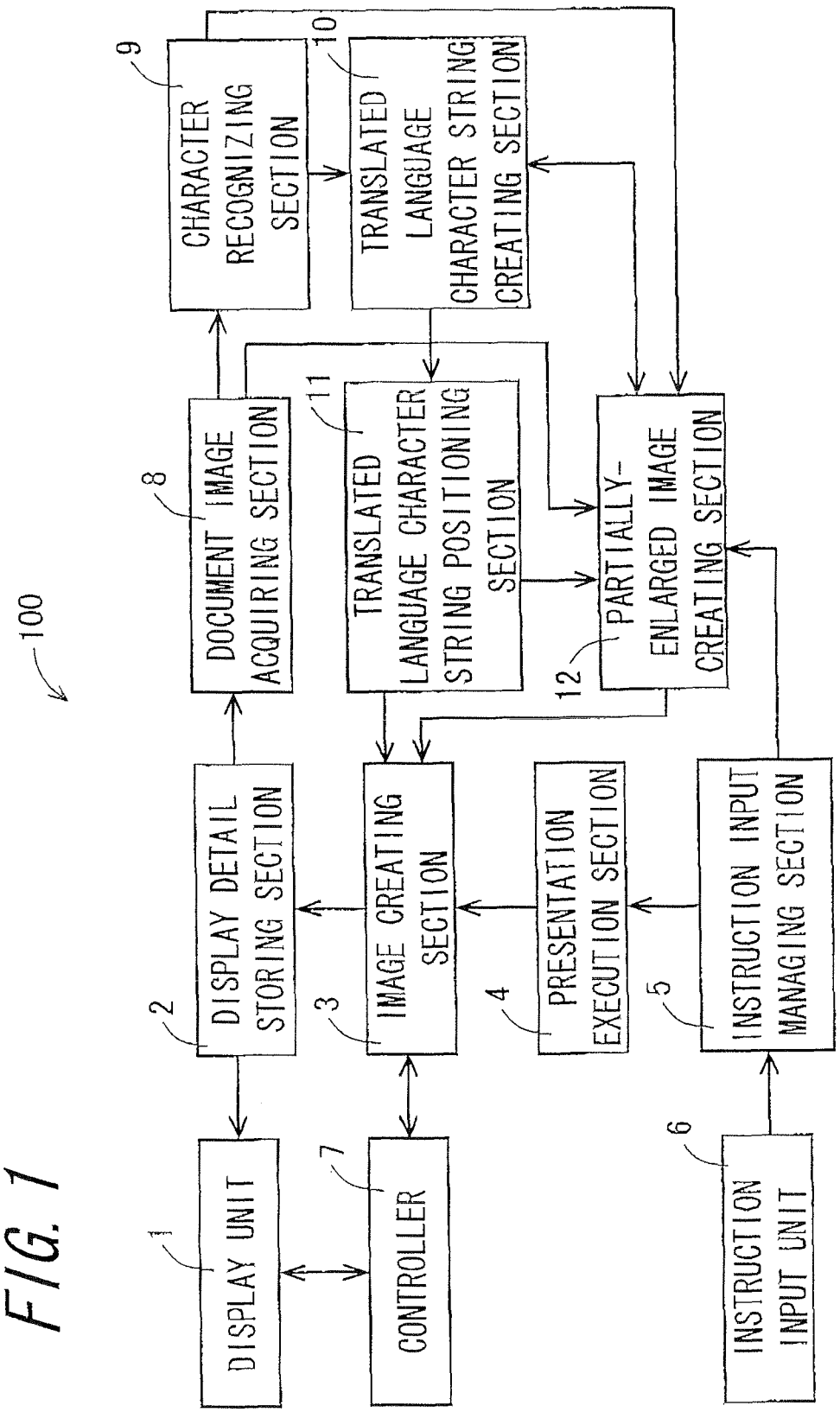

TRANSLATION DISPLAY APPARATUS

CROSS-REFERENCE TO RELATED APPLICATION

This application claims priority to Japanese Patent Application Nos. 2010-252332 and 2011-93200, which were filed on Nov. 10, 2010 and on Apr. 19, 2011, respectively, contents of which are incorporated herein by reference in their entireties.

BACKGROUND OF THE TECHNOLOGY

1. Field of the Technology

The present technology relates to a translation display apparatus.

2. Description of the Related Art

There has been known an apparatus that superimposes translated language character strings, which are obtained by analyzing an original document image of a document in a first language and translating sentences included in the original document image into a second language, on the original document image.

For example, Japanese Unexamined Patent Publication JP-A 2007-249482 discloses a projector having a translation function of translating a character string in a text area selected from an original document image in a first language into a second language. In the technique disclosed in JP-A 2007-249482, the character string (original character string) in the text area selected from the original document image is translated and the translated language character string is displayed on the selected text area or is displayed adjacently to the text area using a pop-up dialog.

However, in the technique disclosed in JP-A 2007-249482, since the translated language character string only for the original character string in the selected text area is displayed, it is not possible to visually recognize translated language character strings corresponding to all the sentences of the original document image. In the technique disclosed in JP-A 2007-249482, since the translated language character string is disposed and displayed at a position on the selected text area or in the vicinity of the selected text area, it is difficult to understand the correspondence between the original character string in the text area and the translated language character string and it cannot be said to be extremely convenient for comparing and visually recognizing the original character string and the translated language character string.

A technique of disposing and displaying translated language character strings of original sentences included in an original document image in inter-line space close to the sentences is disclosed in JP-A 4-311262 (1992) as a technique for solving the above-mentioned problem. In the technique disclosed in JP-A 4-311262, a translated language character string corresponding to a specific character string (original character string) in a document prepared in a first language included in an original document image is disposed and displayed in inter-line space just below the original character string. In this way, since a translated language character string corresponding to an original character string is disposed and displayed in the inter-line space just below the original character string, it is easy to understand the correspondence between an original character string and a translated language character string corresponding to the original character string and it is convenient for comparing and visually recognizing the original character string and the translated language character string.

However, in the technique disclosed in JP-A 4-311262, when the inter-line space between the sentences included in an original document image is small, the translated language character string disposed and displayed in the inter-line space becomes excessively small, thereby making the visual recognition difficult.

SUMMARY OF THE TECHNOLOGY

Therefore, an object of the technology is to provide a translation display apparatus capable of displaying a translated language character string which is obtained by translating a character string in a first language included in a document image into a second language, in a state of being disposed in inter-line space just below the first language character string with excellent convenience for comparing and visually recognizing the original character string and the translated language character string and with improved visibility of the translated language character string.

The technology provides a translation display apparatus including:

a document image acquiring section that acquires a document image of a document containing a sentence composed of a plurality of lines in a first language;

a character recognizing section that extracts a text area from the document image, recognizes first language characters included in the extracted text area, and specifies positions of the first language characters in the document image;

a translated language character string creating section that creates a translated language character string by translating an original character string which is a first language character string including the first language characters recognized by the character recognizing section, into a second language;

a translated language character string positioning section that places the translated language character string so as to be in a position which is close to the original character string and in inter-line space between first language character strings in the document image, based on the positions of the first language characters specified by the character recognizing section;

an image creating section that creates an image of a translated sentence-added document in which the translated language character string is disposed in the document image at the position placed by the translated language character string positioning section;

a display section that displays the image of the translated sentence-added document created by the image creating section;

an enlargement display instruction input section that receives an instruction to enlarge and display a part of the image of the translated sentence-added document displayed on the display section;

a partially-enlarged image creating section that creates a partially-enlarged image in which a part of the image of the translated sentence-added document is enlarged on the basis of the instruction inputted from the enlargement display instruction input section; and a control section that controls the image creating section and the display section, the control section controlling the image creating section to create a partial enlargement-added image which is an image obtained by superimposing the partially-enlarged image on the image of the translated sentence-added document, and controlling the display section to display the partial enlargement-added image when the instruction of enlargement display is inputted from the enlargement display instruction input section.

The translation display apparatus includes the document image acquiring section, the character recognizing section, the translated language character string creating section, the translated language character string positioning section, the image creating section, the display section, the enlargement display instruction input section, the partially-enlarged image creating section, and the control section controlling the image creating section and the display section. The document image acquiring section acquires a document image of a document containing a sentence composed of a plurality of lines in a first language. The character recognizing section extracts a text area from the document image acquired by the document image acquiring section, recognizes first language characters included in the extracted text area, and specifies the position of the first language characters in the document image. The translated language character string creating section creates a translated language character string by translating an original character string which is a first language character including the first language characters recognized by the character recognizing section, into a second language. The translated language character string positioning section places the translated language character string so as to be in a position which is close to the original character string and in inter-line space between first language character strings in the document image, based on the positions of the first language characters specified by the character recognizing section. The image creating section creates an image of a translated sentence-added document in which the translated language character string is disposed in the document image at the position placed by the translated language character string positioning section. The display section displays the image of the translated sentence-added document created by the image creating section. In this way, since the image of the translated sentence-added document in which translated language character string is disposed in the document image at the position which is close to the original character string and in the inter-line space between first language character strings is displayed on the display section, it is easy to understand the correspondence between the original character string of the first language and the translated language character string corresponding to the original character string and it is convenient for comparing and visually recognizing the original character string of the first language and the translated language character string of the second language.

Further, in the translation display apparatus, when an instruction to enlarge and display a part of the image of the translated sentence-added document displayed on the display section is inputted from the enlargement display instruction input section, the partially-enlarged image creating section creates a partially-enlarged image in which a part of the image of a translated sentence-added document is enlarged. Under the control of the control section, the image creating section creates a partial enlargement-added image which is an image obtained by superimposing the partially-enlarged image created by the partially-enlarged image creating section on the image of the translated sentence-added document. Under the control of the control section, the display section displays the partial enlargement-added image. In this way, since the partial enlargement-added image in which a part of the image of the translated sentence-added document is enlarged is displayed on the display section on the basis of the instruction inputted from the enlargement display instruction input section, it is possible to improve the visibility of a desired part of the image of the translated sentence-added document.

Further, it is preferable that the partially-enlargement image creating section creates the partially-enlarged image so that an enlargement factor of an inter-line part in the image of the translated sentence-added document is greater than an enlargement factor of the other part thereof.

The partially-enlarged image creating section creates the partially-enlarged image so that the enlargement factor of the inter-line part in the image of the translated sentence-added document is greater than the enlargement factor of the other part thereof. Accordingly, since the partial enlargement-added image in which the inter-line part in the image of the translated sentence-added document is enlarged with a greater enlargement factor on the basis of the instruction inputted from the enlargement display instruction input section is displayed on the display section, it is possible to enlarge and display the translated language character string disposed in the inter-line space between first language character strings to a greater extent.

Further, it is preferable that the partially-enlarged image creating section creates the partially-enlarged image by adding the original character string to the position in the inter-line space between first language character strings in the image of the translated sentence-added document in an editable state, and the control section controls the image creating section to create the partial enlargement-added image by superimposing the partially-enlarged image, to which the original character string is added in an editable state, on the image of the translated sentence-added document and controls the display section to display the partial enlargement-added image.

The partially-enlarged image creating section creates the partially-enlarged image by adding the original character string to the position in the inter-line space between first language character strings in the image of the translated sentence-added document in an editable state. Accordingly, since the partial enlargement-added image in which the original character string is added to the position in the inter-line space between first language character strings in the image of the translated sentence-added document is displayed on the display section, it is possible to compare and visually recognize the document image in the first language and the translated language character string of the second language in the translated sentence-added document and the original character string of the first language recognized by the character recognizing section. As a result, it is possible to visually recognize whether the original character string of the first language is the character string obtained by causing the character recognizing section to correctly recognize the document image.

Further, it is preferable that the translation display apparatus includes a correction instruction input section that receives an instruction to correct the original character string which is added to the partially-enlarged image in an editable state, the translated language character string creating section creating a new translated language character string by translating the original character string corrected based on the instruction inputted from the correction instruction input section into the second language, the partially-enlarged image creating section creating a partially-enlarged image in which the new translated language character string is disposed, and the control section controlling the image creating section to create a partial enlargement-added image by superimposing the partially-enlarged image having the new translated language character string disposed therein on the image of the translated sentence-added document, and controlling the display section to display the partial enlargement-added image.

The translation display apparatus further includes the correction instruction input section. The correction instruction input section receives an instruction to correct the original character string added to the partially-enlarged image in an editable state. The translated language character string creating section creates the new translated language character string by translating the original character string corrected on the basis of the instruction inputted from the correction instruction input section into the second language. The partially-enlarged image creating section creates the partially-enlarged image having the new translated language character string disposed therein. Accordingly, since the partially-enlarged image having the new translated language character string corresponding to the corrected original character string disposed therein is displayed on the display section, it is possible to visually recognize the new translated language character string into which the original character string is correctly translated.

The technology provides a translation display apparatus including:

a document image acquiring section that acquires a document image of a document containing a sentence composed of a plurality of lines in a first language;

a character recognizing section that extracts a text area from the document image, recognizes first language characters included in the extracted text area, and specifies positions of the first language characters in the document image;

a translated language character string creating section that creates a translated language character string by translating an original character string which is a first language character string including the first language characters recognized by the character recognizing section, into a second language;

a translated language character string positioning section that places the translated language character string so as to be in a position which is close to the original character string and in inter-line space between first language character strings in the document image, based on the positions of the first language characters specified by the character recognizing section;

an image creating section that creates an image of a translated sentence-added document in which the translated language character string is disposed in the document image at the position placed by the translated language character string positioning section;

a storage section that stores an image of a translated sentence-added document every time the image creating section creates an image of a translated sentence-added document;

a translated language character string changing area extracting section that compares an image of a translated sentence-added document last stored in the storage section with an image of a translated sentence-added document stored previously thereto and extracts a translated language character string changing area indicating an area in which the translated language character string is different from the image of a translated sentence-added document last stored;

an emphasized translated language character string creating section that creates an emphasized translated language character string by recognizing a translated language character string included in the translated language character string changing area extracted by the translated language character string changing area extracting section and emphasizing the recognized translated language character string; and a display section that displays an image in which the emphasized translate character string is superimposed on the translated language character string changing area of the image of a translated sentence-added document last stored.

The translation display apparatus includes the document image acquiring section, the character recognizing section, the translated language character string creating section, the translated language character string positioning section, the image creating section, the storage section, the translated language character string changing area extracting section, the emphasized translated language character string creating section, and the display section. The document image acquiring section acquires a document image of a document containing a sentence composed of a plurality of lines in a first language. The character recognizing section extracts a text area from the document image acquired by the document image acquiring section, recognizes first language characters included in the extracted text area, and specifies the position of the first language characters in the document image. The translated language character string creating section creates a translated language character string by translating an original character string which is a first language character string including the first language characters recognized by the character recognizing section, into a second language. The translated language character string positioning section places the translated language character string so as to be in a position which is close to the original character string and in inter-line space between first language character strings in the document image, based on the position of the first language characters specified by the character recognizing section. The image creating section creates an image of a translated sentence-added document in which the translated language character string is disposed in the document image at the position placed by the translated language character string positioning section.

In this way, in the translation display apparatus, since the image of the translated sentence-added document in which the translated language character string is disposed in the document image at the position which is close to the original character string and in the inter-line space between first language character strings is created, it is easy to understand the correspondence between the original character string of the first language and the translated language character string corresponding to the original character string and it is convenient for comparing and visually recognizing the original character string of the first language and the translated language character string of the second language.

Further in the translation display apparatus, the storage section stores the image of the translated sentence-added document every time the image creating section creates an image of a translated sentence-added document. The translated language character string changing area extracting section compares an image of a translated sentence-added document last stored in the storage section with an image of a translated sentence-added document stored previously thereto and extracts the translated language character string changing area indicating an area in which the translated language character string is different from the image of a translated sentence-added document last stored. The emphasized translated language character string creating section creates an emphasized translated language character string by recognizing the translated language character string included in the translated language character string changing area extracted by the translated language character string changing area extracting section and emphasizing the recognized translated language character string. The display section displays an image in which the emphasized translated language character string is superimposed on the translated language character string changing area of the image of the translated sentence-added document last stored.

In this way, in the translation display apparatus, since the image in which the translated language character string included in the translated language character string changing area in the image of the newest translated sentence-added document last stored is emphasised is displayed on the display section, it is possible to improve the visibility of the translated language character string in the image of the translated sentence-added document which is different from the previous state.

BRIEF DESCRIPTION OF THE DRAWINGS

Other and further objects, features, and advantages of the technology will be more explicit from the following detailed description taken with reference to the drawings wherein:

FIG. 1 is a block diagram illustrating the configuration of a translation display apparatus according to an embodiment;

DETAILED DESCRIPTION

Figure 2A:
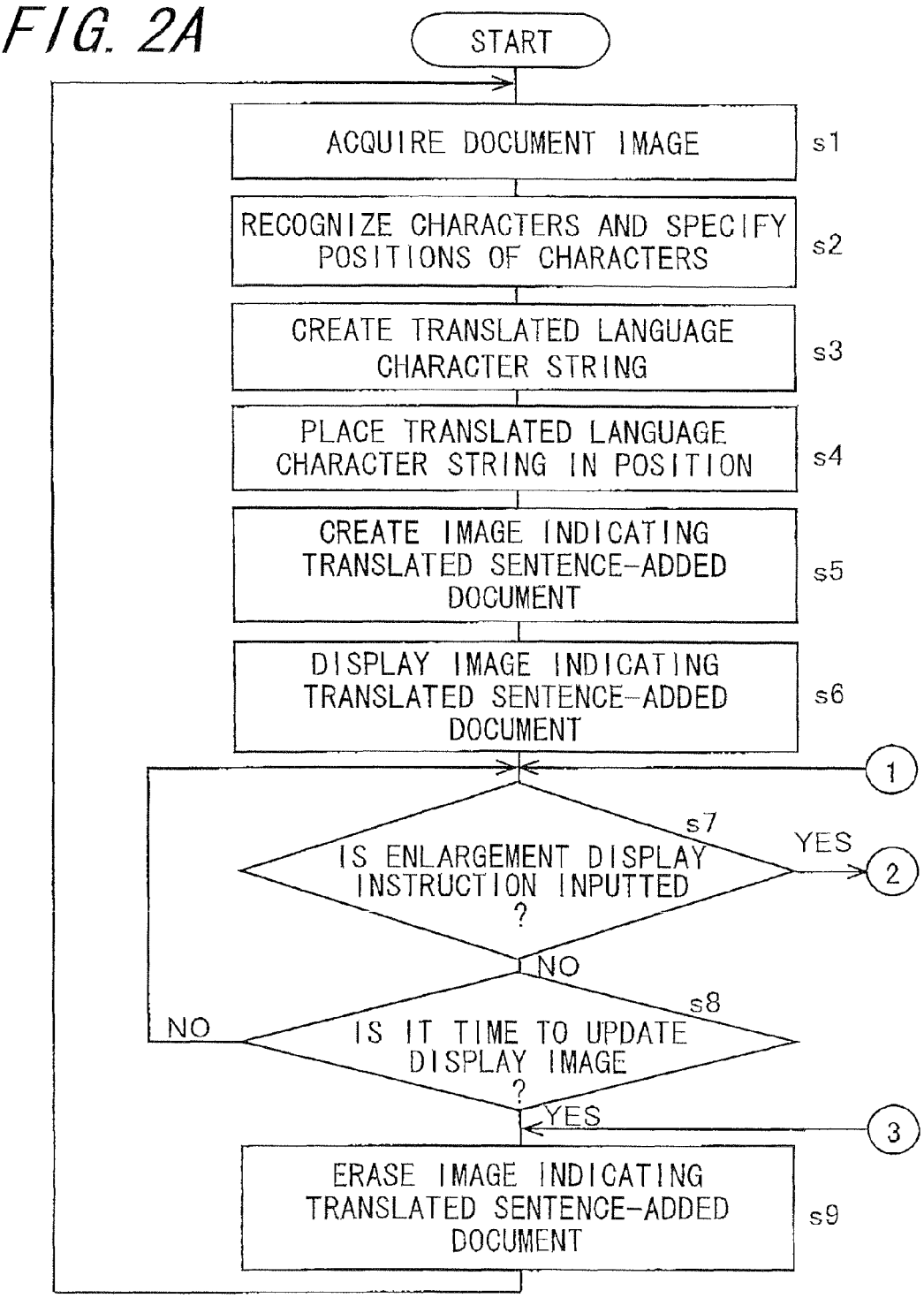
FIGS. 2A and 2B are flowcharts illustrating a procedure of processes performed by the translation display apparatus.
Figure 2B:
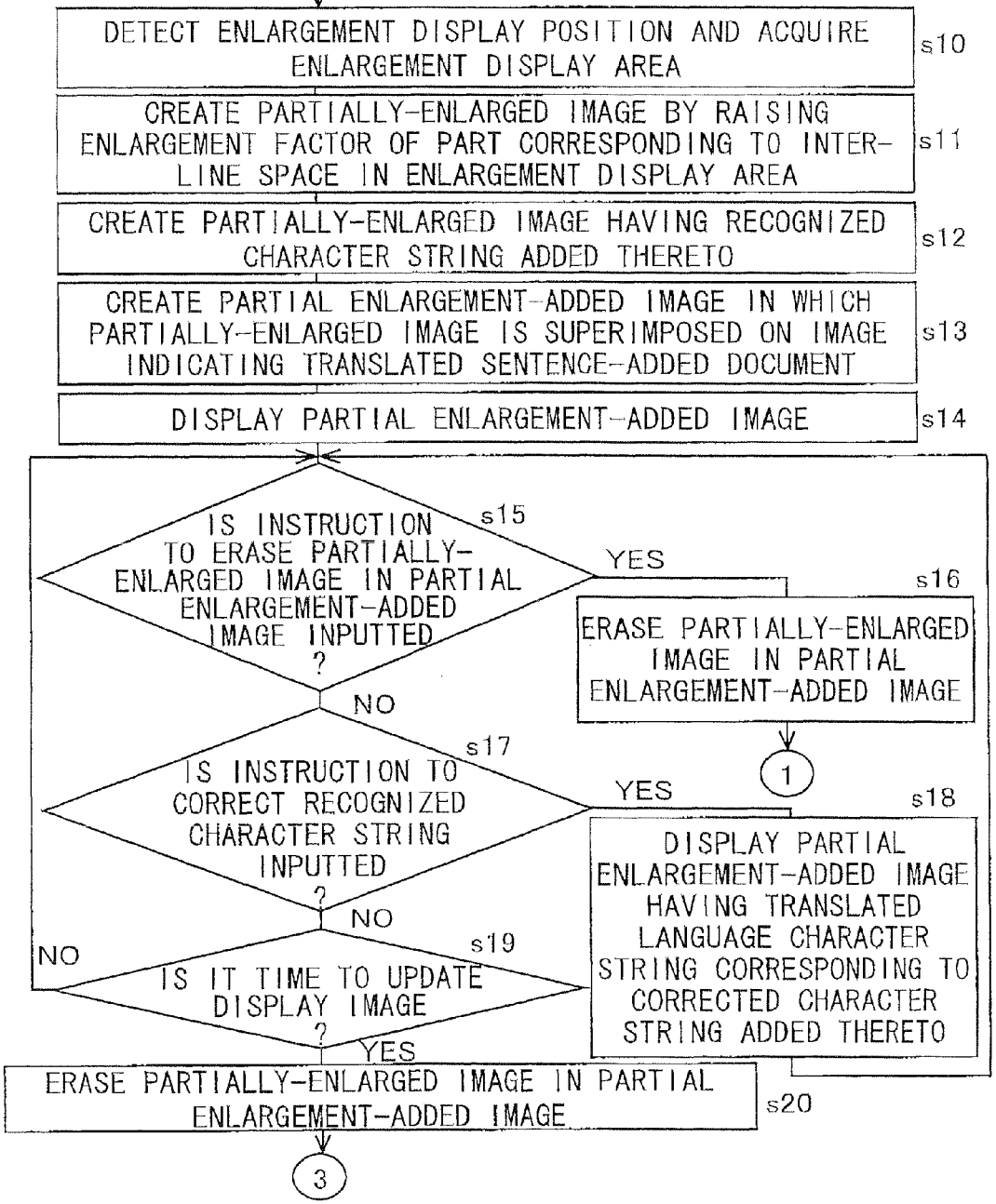

FIG. 1 is a block diagram illustrating the configuration of a translation display apparatus 100 according to an embodiment. The translation display apparatus 100 includes a display unit 1 as the display section, a display detail storing section 2, an image creating section 3, a presentation execution section 4, an instruction input managing section 5, an instruction input unit 6, a controller 7, a document image acquiring section 8, a character recognizing section 9, a translated language character string creating section 10, a translated language character string positioning section 11, and a partially-enlarged image creating section 12.

The translation display apparatus 100 is constructed by a general-purpose computer such as a personal computer, and is a device that disposes a translated language character string in a second language (for example, Japanese) into which a character string in a first language (for example, English) included in a document image is translated in inter-line space just below the first language character string and displays the resultant in a window screen when an application program is executed using a window display function which is a basic function of an CS of the personal computer. The document image includes document data prepared by a CAD (Computer Aided Design), a variety of word processor software, or the like and includes a plurality of pages which are arranged in a predetermined order. The translation display apparatus 100 according to this embodiment displays an image in which translated language character strings are arranged in inter-line space between first language character strings in real time, every time an instruction to output a page of a document image including a plurality of pages is inputted from the instruction input unit 6 and the document image displayed on the display unit 1 is changed. The translation display apparatus 100 according to this embodiment is used when an operator of the apparatus gives a presentation to the audience while watching a document image displayed by the display unit 1, and the like.

The display unit 1 is an element for displaying a variety of information and is embodied by a liquid crystal display or the like. The display detail storing section 2 is an element for temporarily storing information such as an image displayed by the display unit 1 and is embodied, for example, by a RAM (Random Access Memory).

The instruction input unit 6 serves as an enlargement display instruction input section and a correction instruction input section and is embodied by a keyboard, a mouse, and the like to which information such as a variety of processing instructions is inputted by an operator's operation. The instruction input managing section 5 acquires an instruction signal indicating a processing instruction inputted from the instruction input unit 6 and sends the instruction signal to the presentation execution section 4 and the partially-enlarged image creating section 12.

FIGS. 2A and 2S are flowcharts illustrating the flow of processes performed by the translation display apparatus 100. In the translation display apparatus 100, an instruction signal indicating a processing instruction of document image display inputted from the instruction input unit 6 is acquired by the instruction input managing section 5 and the acquired instruction signal is sent to the presentation execution section 4. The presentation execution section 4 having received the instruction signal of document image display acquires data of the document image including a plurality of pages from a storage unit not shown and sends the acquired data of the document image to the image creating section 3. The image creating section 3 sends the received data of the document image to the display detail storing section 2 and the display detail storing section 2 temporarily stores the data of the document image. In the translation display apparatus 100, when the display unit 1 extracts the data of the document image from the display detail storing section 2 and displays the document image, a translation display process is started.

In step s1, the document image acquiring section 8 acquires the data of the document image from the display detail storing section 2.

In step s2, the character recognizing section 9 extracts a text area including characters from the data of the document image acquired by the document image acquiring section 8. Specifically, the character recognizing section 9 performs a segmentation process. For example, the character recognizing section 9 classifies the document image into a text area, a photograph area, a halftone dot area, a background area, and the like on the basis of an edge detection result and extracts the text area as the segmentation result. The character recognizing section 9 performs a process of recognizing characters in a first language included in the extracted text area. The character recognizing section 9 recognizes the first language characters included in the text area and specifies the position of the first language characters in the document image, for example, by the use of an OCR (Optical Character Recognition) technique according to the related art. The position of each character is expressed by an X coordinate of the left end of the character in the document image, a Y coordinate of the upper end, an X coordinate of the right end, and a Y coordinate of the lower end. The character recognizing section 9 recognizes a space between the Y coordinate of the lower end of a character in a line and the Y coordinate of the upper end of a character in a next line as inter-line space.

In step s3, the translated language character string creating section 10 creates a translated language character string by translating an original character string which is a first language character string including the first language characters recognized by the character recognizing section 9 into the second language, The translated language character string creating section 10 acquires translated words corresponding to the original character string from a dictionary database (not shown) and creates the translated language character string.

In step s4, the translated language character string positioning section 11 places the translated language character string created by the translated language character string creating section 10 so as to be in a position which is close to the original character string and in the inter-line space between first language character strings in the document image, based on the positions of the first language characters specified by the character recognizing section 9.

In step s5, the image creating section 3 creates an image of a translated sentence-added document in which the translated language character string is disposed in the document image at the position corresponding to the position placed by the translated language character string positioning section 11. The created image of the translated sentence-added document is temporarily stored in the display detail storing section 2.

In step s6, the display unit 1 extracts and displays the image of the translated sentence-added document from the display detail storing section 2. In this way, in the translation display apparatus 100 according to this embodiment, since the image of the translated sentence-added document in which the translated language character string is disposed in the document image at the position which is close to the original character string and in the inter-line space between first language character strings is displayed on the display unit 1, it is easy to understand the correspondence between the original character string of the first language and the translated language character string corresponding to the original character string and it is convenient for comparing and visually recognizing the original character string of the first language and the translated language character string of the second language.

In step s7, the instruction input managing section 5 determines whether an enlargement display instruction is inputted from the instruction input unit 6. The procedure goes to step s10 when the instruction input-managing section 5 determines that the enlargement display instruction is inputted, and the procedure goes to step s8 when the instruction input managing section 5 determines that the enlargement display instruction is not inputted.

In step s8, the instruction input managing section 5 determines whether it is time to update a display image. The instruction input managing section 5 checks the display image displayed on the display unit 1 every predetermined time and determines the timing to update the display image depending on whether the display image is changed. For example, the instruction input managing section 5 determines that it is time to update the display image when an instruction to output a page of the document image and the like is inputted from the instruction input unit 6 and the document image displayed on the display unit 1 is changed. The procedure goes to step s9 when the instruction input managing section 5 determines that it is time to update the display image, and the procedure returns to step s7 when the instruction input managing section 5 determines that it is not time to update the display image. In step s9, the display detail storing section 2 erases the image of the translated sentence-added document, and the procedure returns to step s1.

When it is determined in step s7 that the enlargement display instruction is inputted, the partially-enlarged image creating section 12 detects the position (enlargement display position) pointed by the instruction input unit (mouse) 6 in the image of the translated sentence-added document displayed on the display unit 1 and acquires a predetermined area (enlargement display area) around the pointed position in step s10.

In step s11, the partially-enlarged image creating section 12 creates a partially-enlarged image in which the enlargement factor of a part corresponding to the inter-line space in the enlargement display area is raised in the image of the translated sentence-added document. Specifically, the partially-enlarged image creating section 12 classifies the image of the translated sentence-added document in the enlargement display area into a text area and an inter-line area. The partially-enlarged image creating section 12 raises the enlargement factor of the part corresponding to the inter-line space in the enlargement display area by setting "n<m", where "n" represents the enlargement factor of the text area and "m" represents the enlargement factor of the inter-line space in a direction perpendicular to the arrangement direction of characters. The partially-enlarged image created by the partially-enlarged image creating section 12 has, for example, a format using a pop-up dialog.

In step s12, the partially-enlarged image creating section 12 creates the partially-enlarged image by adding the original character string (the recognized character string) recognized by the character recognizing section 9 to the position corresponding to the inter-line space in the image of the translated sentence-added document in an editable state.

In step s13, the image creating section 3 creates a partial enlargement-added image, which is an image in which the partially-enlarged image created by the partially-enlarged image creating section 12 is superimposed on the image of the translated sentence-added document, under the control of the controller 7. The partial enlargement-added image created in this way is temporarily stored in the display detail storing section 2.

In step s14, the display unit 1 extracts and displays the partial enlargement-added image from the display detail storing section 2.

As described above, in the translation display apparatus 100 according to this embodiment, since the partial enlargement-added image in which a part of the image of the translated sentence-added document is enlarged is displayed on the display unit 1 on the basis of the instruction inputted from the instruction input unit 6, it is possible to improve the visibility of a desired part in the image of the translated sentence-added document.

Further, in the translation display apparatus 100 according to this embodiment, the partially-enlarged image creating section 12 creates the partially-enlarged image that the enlargement factor of the part corresponding to the inter-line space in the image of the translated sentence-added document is greater than the enlargement factor of the other part thereof. Accordingly, in the translation display apparatus 100, since the partial enlargement-added image in which the part corresponding to the inter-line space in the image of the translated sentence-added document is greatly enlarged is displayed on the display unit 1, it is possible to more greatly enlarge and display the translated language character string disposed in the inter-line space.

Further, in the translation display apparatus 100 according to this embodiment, the partially-enlarged image creating section 12 creates the partially-enlarged image by adding the original character string to the position corresponding to the inter-line space in the image of the translated sentence-added document in an editable state. Accordingly, in the translation display apparatus 100, since the partial enlargement-added image in which the original character string is added to the position corresponding to the inter-line space in the image of the translated sentence-added document is displayed on the display unit 1, it is possible to compare and visually recognize the document image in the first language and the translated language character string of the second language in the translated sentence-added document and the original character string of the first language recognized by the character recognizing section 9. Accordingly, it is possible to visually recognize whether the original character string of the first language is the character string obtained by causing the character recognizing section 9 to correctly recognize the document image.

In step s15, the instruction input managing section 5 determines whether an instruction to erase the partially-enlarged image in the partial enlargement-added image displayed on the display unit 1 is inputted from the instruction input unit 6. The procedure goes to step s16 when the instruction input managing section 5 determines that the instruction to erase the partially-enlarged image is inputted, and the procedure goes to step s17 when the instruction input managing section determines that the instruction to erase the partially-enlarged image is not inputted.

In step s16, the image creating section 3 creates an image in which the partially-enlarged image in the partial enlargement-added image is erased, that is, an image of the translated sentence-added document before the partially-enlarged image is superimposed thereon. Accordingly, the image of the translated sentence-added document in which the partially-enlarged image is erased is displayed on the display unit 1. In this way, when the image of the translated sentence-added document in which the partially-enlarged image is erased is completely displayed, the procedure returns to step s7.

In step S17, the instruction input managing section 5 determines whether an instruction to correct the original character string (the recognized character string) added in an editable state in the partially-enlarged image of the partial enlargement-added image is inputted from the instruction input unit 6. The instruction input managing section 5 determines whether the correction instruction is inputted depending on whether the part corresponding to the original character string added in an editable state is pointed by the instruction input unit (mouse) 6 in the partial enlargement-added image displayed on the display unit 1. The correction of the original character string is performed by the instruction input unit 6. The original character string becomes an editable window when it is pointed by the instruction input unit 6, and can be edited and corrected through the operation of the mouse or the keyboard. When an end button is pressed through the instruction input unit 6 (or is double clicked through the mouse), the editing and correcting operation is finished. The procedure goes to step s18 when the instruction input managing section 5 determines that the correction instruction is inputted, and the procedure goes to step s19 when the instruction input managing section 5 determines that the correction instruction is not inputted.

In step s18, first, the translated language character string creating section 10 creates a new translated language character string by translating the original character string corrected on the basis of the instruction inputted from the instruction input unit 6 into the second language. Then, the partially-enlarged image creating section 12 creates a partially-enlarged image having the new translated language character string disposed therein. Under the control of the controller 7, the image creating section 3 creates a partial enlargement-added image by superimposing the partially-enlarged image having the new translated language character string disposed therein on the image of the translated sentence-added document, and the display unit 1 displays the newly-created partial enlargement-added image. In this way, when the newly-created partial enlargement-added image is completely displayed, the procedure returns to step s15.

In step s19, the instruction input managing section 5 determines whether it is time to update the display image. The procedure goes to step s20 when the instruction input managing section 5 determines that it is time to update the display image, and the procedure returns to step s15 when the instruction input managing section 5 determines that it is not time to update the display image. In step s20, the image creating section 3 creates an image in which the partially-enlarged image in the partial enlargement-added image is erased, that is, an image of the translated sentence-added document before the partially-enlarged image is superimposed thereon. Accordingly, the image of the translated sentence-added document in which the partially-enlarged image is erased is displayed on the display unit 1. In this way, when the image of the translated sentence-added document in which the partially-enlarged image is erased is completely displayed, the procedure returns to step s9.

As described above, in the translation display apparatus 100 according to this embodiment, since the partially-enlarged image in which the new translated language character string corresponding to the corrected original character string is displayed on the display unit 1, it is possible to visually recognize the correctly-translated, new translated language character string.

Figure 3:
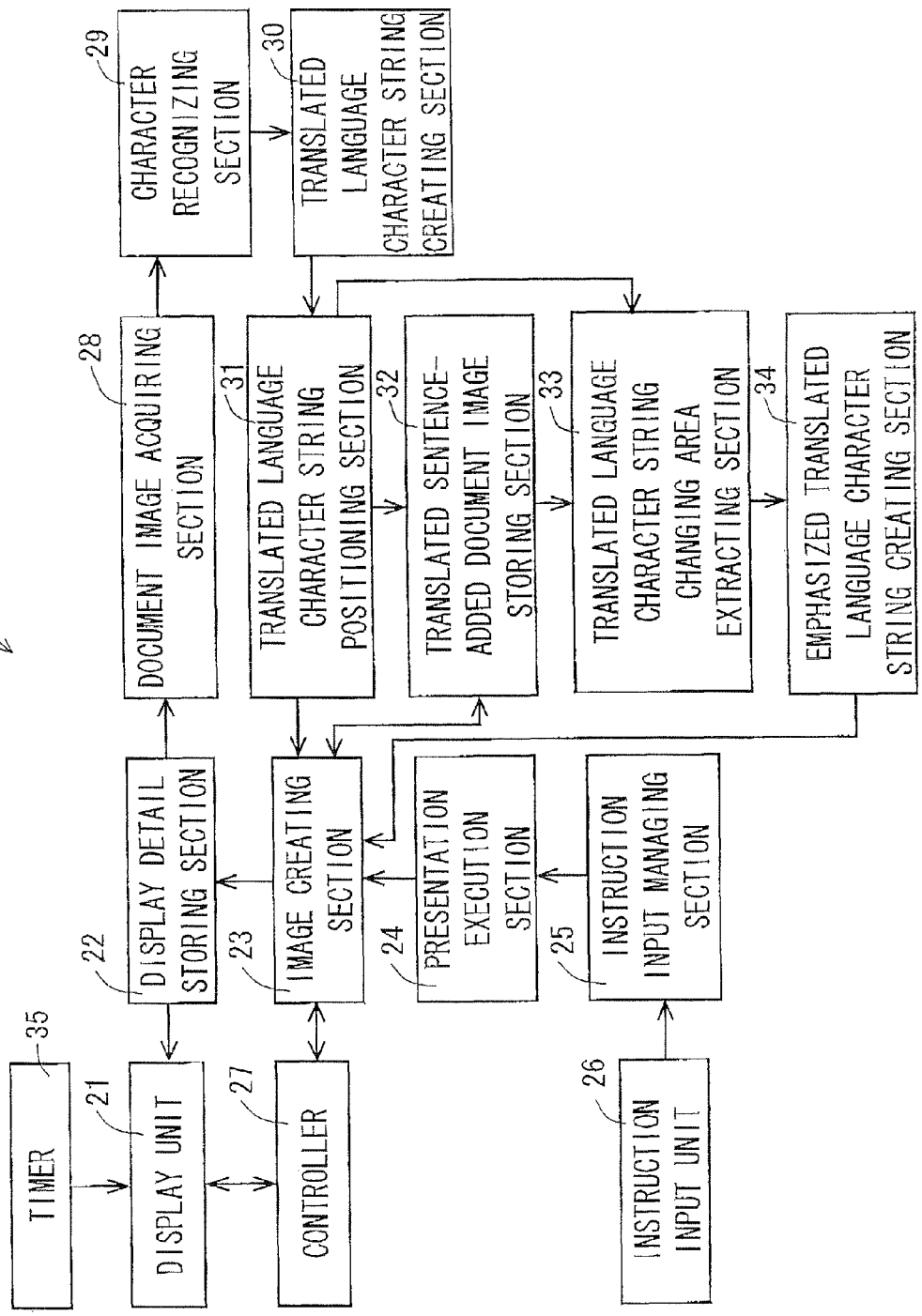
FIG. 3 is a block diagram illustrating the configuration of a translation display apparatus according to another embodiment.

FIG. 3 is a block diagram illustrating the configuration of a translation display apparatus 200 according to another embodiment. The translation display apparatus 200 includes a display unit 21 as the display section, a display detail storing section 22, an image creating section 23, a presentation execution section 24, an instruction input managing section 25, an instruction input unit 26, a controller 27 for controlling the display unit 21 and the image creating section 23, a document image acquiring section 28, a character recognizing section 29, a translated language character string creating section 30, a translated language character string positioning section 31, a translated sentence-added document image storing section 32, a translated language character string changing area extracting section 33, an emphasized translated language character string creating section 34, and a timer 35.

Similarly to the above-mentioned translation display apparatus 100, the translation display apparatus 200 is an apparatus that translates a character string in a first language (for example, English) included in a document image into a second language (for example, Japanese) and disposes and displays the translated language character string in inter-line space lust below the first language character string.

The document image includes document data prepared by a CAD, a variety of word processor software, or the like and includes a plurality of pages which are arranged in a predetermined order. The translation display apparatus 200 according to this embodiment displays an image in which translated language character strings are arranged in inter-line space between first language character strings in real time, every time an instruction to output a page of a document image including a plurality of pages is inputted from the instruction input unit 26 and the document image displayed on the display unit 21 is changed.

The display unit 21 is a unit for displaying a variety of information and is embodied by a liquid crystal display or the like. The display detail storing section 22 is a unit for temporarily storing information such as an image displayed by the display unit 21 and is embodied, for example, by a RAM.

The instruction input unit 26 is embodied by a keyboard, a mouse, and the like to which information such as a variety of processing instructions is inputted by an operator's operation. The instruction input managing section 25 acquires an instruction signal indicating a processing instruction inputted from the instruction input unit 26 and sends the instruction signal to the presentation execution section 24.

Figure 4:
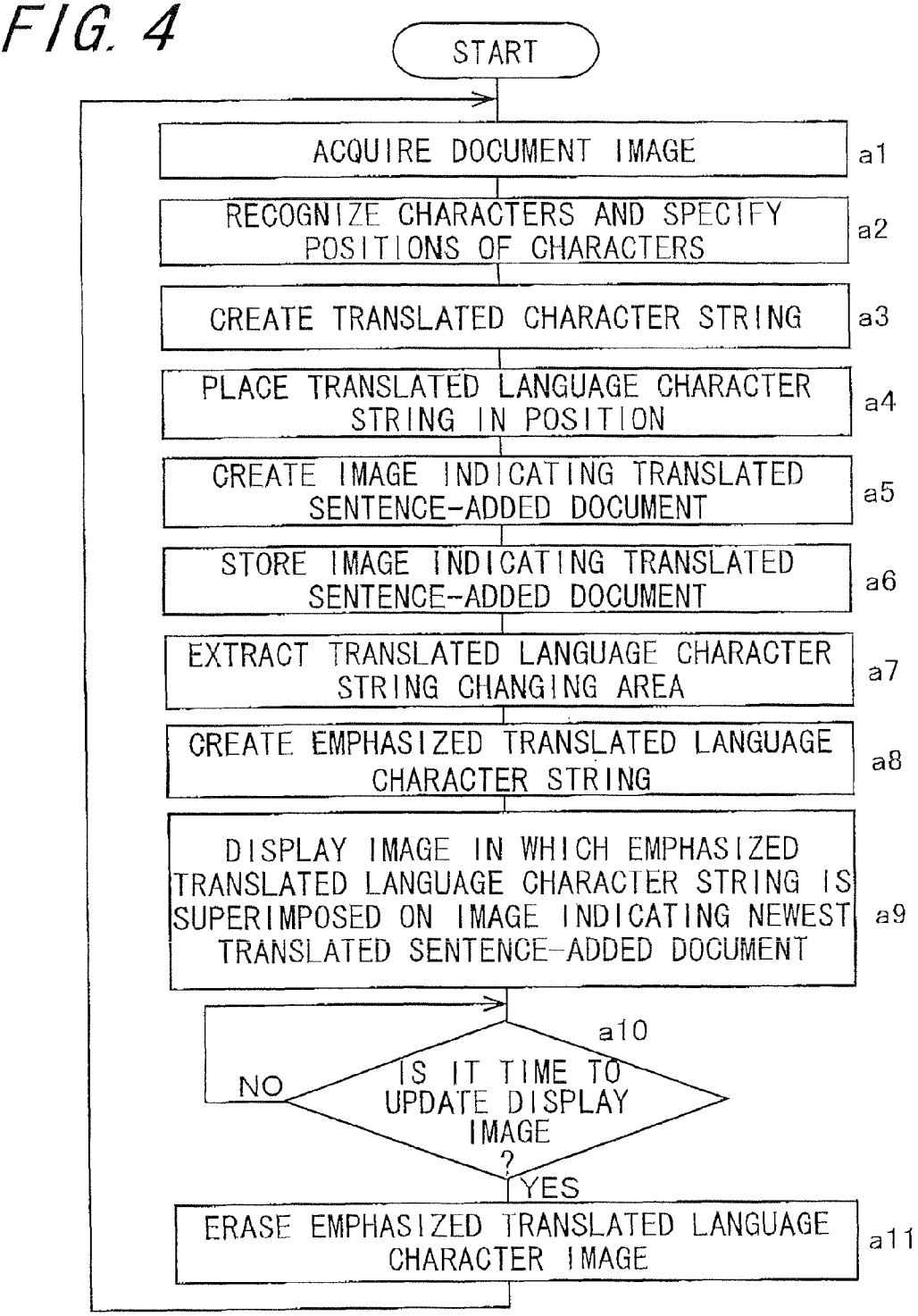
FIG. 4 is a flowchart illustrating a procedure of processes performed by the translation display apparatus.

FIG. 4 is a flowchart illustrating a procedure of processes performed by the translation display apparatus 200. In the translation display apparatus 200, an instruction signal indicating a processing instruction of document image display inputted from the instruction input unit 26 is acquired by the instruction input managing section 25 and the acquired instruction signal is sent to the presentation execution section 24. The presentation execution section 24 having received the instruction signal of document image display sends data of the document image including a plurality of pages to the image creating section 23. The image creating section 23 sends the received data of the document image to the display detail storing section 22 and the display detail storing section 22 temporarily stores the data of the document image. In the translation display apparatus 200, when the display detail storing section 22 temporarily stores the data of the document image, a translation display process is started.

In step a1, the document image acquiring section 28 acquires the data of the document image from the display detail storing section 22.

In step a2, the character recognizing section 29 extracts a text area including characters from the data of the document image acquired by the document image acquiring section 28. Specifically, the character recognizing section 29 performs a segmentation process. For example, the character recognizing section 29 classifies the document image into a text area, a photograph area, a halftone dot area, a background area, and the like on the basis of an edge detection result and extracts the text area as the segmentation result. The character recognizing section 29 performs a process of recognizing characters in a first language included in the extracted text area.

The character recognizing section 29 recognizes the first language characters included in the text area and specifies the position of the first language characters in the document image, for example, by the use of an OCR technique according to the related art. The position of each character is expressed by an X coordinate of the left end of the character in the document image, a Y coordinate of the upper end, an X coordinate of the right end, and a Y coordinate of the lower end. The character recognizing section 29 recognizes a space between the Y coordinate of the lower end of a character in a line and the Y coordinate of the upper end of a character in a next line as inter-line space.

In step a3, the translated language character string creating section 30 creates a translated language character string by translating the original character string which is a first language character string including the first language characters recognized by the character recognizing section 29 into the second language. The translated language character string creating section 30 acquires translated words corresponding to the original character string from a dictionary database and creates the translated language character string.

In step a4, the translated language character string positioning section 31 places the translated language character string created by the translated language character string creating section 30 so as to be in a position which is close to the original character string and in the inter-line space between first language character strings in the document image, based on the positions of the first language characters specified by the character recognizing section 29.

In step a5, the image creating section 23 creates an image of a translated sentence-added document in which the translated language character string is disposed in the document image at the position corresponding to the position placed by the translated language character string positioning section 31.

In step a6, the translated sentence-added document image storing section 32 as the storage section stores an image of a translated sentence-added document every time the image creating section 23 creates the image of the translated sentence-added document. In the translation display apparatus 200, every time an instruction to output a page of a document image including a plurality of pages or the like is inputted from the instruction input unit 26, the image creating section 23 creates an image of the translated sentence-added document, but the translated sentence-added document image storing section 32 stores the images indicating the translated sentence-added document in the order or creation.

In, step a7, the translated language character string changing area extracting section 33 extracts an image (hereinafter, referred to as "image of the newest translated sentence-added document") indicating the newest translated sentence-added document last stored and an image (hereinafter, referred to as "image of the previous translated sentence-added document") indicating any translated sentence-added document stored previously thereto from the translated sentence-added document image storing section 32, and compares the translated language character strings included in the images to each other. The image of the previous translated sentence-added document extracted by the translated language character string changing area extracting section 33 may be an image immediately previous to the newest image or an image stored earlier than that in the translated sentence-added document image storing section 32.

The translated language character string changing area extracting section 33 compares the image of the newest translated sentence-added document and the image of the previous translated sentence-added document extracted from the translated sentence-added document image storing section 32 and extracts a translated language character string changing area indicating an area in which the translated language character string is different from the image of the newest translated sentence-added document.

For example, when a partial translated language character string is different between the image of the newest translated sentence-added document and the image of the previous translated sentence-added document, the translated language character string changing area extracting section 33 extracts the changed partial area as a translated language character string changing area. When the overall translated language character strings are different between the image of the newest translated sentence-added document and the image of the previous translated sentence-added document, the translated language character string changing area extracting section 33 extracts the changed overall area as the translated language character string changing area.

When only one image of a translated sentence-added document is stored in the translated sentence-added document image storing section 32, the translated language character string changing area extracting section 33 extracts only the image of the translated sentence-added document from the translated sentence-added document image storing section 32 and extracts the overall translated language character strings included in the extracted image of the translated sentence-added document as the translated language character string changing area.

In step a8, the emphasized translated language character string creating section 34 creates an emphasized translated language character string by recognizing the translated language character string included in the translated language character string changing area extracted by the translated language character string changing area extracting section 33 and performing a process of emphasizing the recognized translated language character string.

In comparison with the translated language character strings outside the translated language character string changing area, the emphasized translated language character string creating section 34 creates the emphasized translated language character string by performing an emphasizing process such as enlarging the size of characters, changing the font of characters, or changing the color of characters on the translated language character string in the translated language character string changing area.

When the emphasized translated language character string is created by enlarging the size of characters of the translated language character string in the translated language character string changing area, the emphasized translated language character string creating section 34 creates the emphasized translated language character string by raising the enlargement factor of the part corresponding to the inter-line space in the translated language character string changing area in the image of the newest translated sentence-added document. When the emphasized translated language character string is created by changing the font of characters of the translated language character string in the translated language character string changing area or by changing the color of the characters, the emphasized translated language character string creating section 34 creates the emphasized translated language character string by changing the translated language character string in the translated language character string changing area in the image of the newest translated sentence-added document into the predetermined font or color other than that of the translated language character strings outside the translated language character string changing area.

In step a9, the image creating section 23 creates, under the control of the controller 27, an emphasized translated language character image which is an image in which the emphasized translated language character string created by the emphasized translated language character string creating section 34 is superimposed on the translated language character string changing area of the image of the newest translated sentence-added document. The emphasized translated language character image created by the image creating section 23 is an image in which the emphasized translated language character string is superimposed on a background having the same color as the underlying color such that the translated language character strings in the translated language character string changing area disposed below the emphasized translated language character string is not visually recognized.

When an image in which the emphasized translated language character string with an enlarged size of characters is superimposed is created, a superimposing area of the enlarged emphasized translated language character string is secured in the right and left sides outside the translated language character string changing area in the image of the translated sentence-added document, for example, so as to insert the enlarged emphasized translated language character string, by reducing the character spacing of the translated language character string, moving the entire translated language character string to the right or left side, or the like.

The emphasized translated language character image created in this way is temporarily stored in the display detail storing section 22. Under the control of the controller 27, the display unit 21 extracts the emphasized translated language character image from the display detail storing section 22 and displays the extracted image.

In the translation display apparatus 200 according to this embodiment, the timer 35 counts the time after the emphasized translated language character image is displayed on the display unit 21. When a predetermined time passes after the emphasized translated language character image is displayed on the display unit 21, the image creating section 23 creates an image in which the emphasized translated language character string in the emphasized translated language character image is erased, that is, the image of the newest translated sentence-added document before the emphasized translated language character string is superimposed. Accordingly, the image of the translated sentence-added document in which the emphasized translated language character string is erased is displayed on the display unit 21.

The translation display apparatus 200 may be configured to create the image in which the emphasized translated language character string is erased from the emphasized translated language character image on the basis of an instruction inputted from the instruction input unit 26. In this case, the instruction input managing section 25 determines whether an instruction to erase the emphasized translated language character string in the emphasized translated language character image displayed on the display unit 21 is inputted from the instruction input unit 26. When the instruction input managing section 25 determines that the instruction to erase the emphasized translated language character string is inputted, the image creating section 23 creates the image in which the emphasized translated language character string in the emphasized translated language character image is erased, whereby the image of the translated sentence-added document in which the emphasized translated language character string is erased is displayed on the display unit 21.

In step a10, the instruction input managing section 25 determines whether it is time to update a display image. The instruction input managing section 25 checks the display image displayed on the display unit 21 every predetermined time and determines the timing to update the display image depending on whether the display image is changed. For example, the instruction input managing section 25 determines that it is time to update the display image when an instruction to output a page of the document image and the like is inputted from the instruction input unit 26 and the document image displayed on the display unit 21 is changed. The procedure goes to step a11 when the instruction input managing section 25 determines that it is time to update the display image, and the process of step a10 is repeated when the instruction input managing section 25 determines that it is not time to update the display image. In step a11, the display detail storing section 22 erases the emphasized translated language character image, and the procedure returns to step a1.

As described above, in the translation display apparatus 200 according to this embodiment, since the image of the translated sentence-added document in which the translated language character string is disposed at the position which is close to the original character string and in the inter-line between the first language character strings in the document image is created, it is easy to understand the correspondence between the original character string of the first language and the translated language character string corresponding to the original character string and it is convenient for comparing and visually recognizing the original character string of the first language and the translated language character string of the second language.

In the translation display apparatus 200 according to this embodiment, since the image (the emphasized translated language character image) in which the translated language character string included in the translated language character string changing area in the image of the newest translated sentence-added document is emphasized is displayed on the display unit 21, it is possible to improve the visibility of the changed translated language character string in the image of the translated sentence-added document.

The technology may be embodied in other specific forms without departing from the spirit or essential characteristics thereof. The present embodiments are therefore to be considered in all respects as illustrative and not restrictive, the scope of the technology being indicated by the appended claims rather than by the foregoing description and all changes which come within the meaning and the range of equivalency of the claims are therefore intended to be embraced therein.

What is claimed is:

1. A translation display apparatus comprising:
   a document image acquiring section that acquires a document image of a document containing a sentence composed of a plurality of lines in a first language;
   a character recognizing section that extracts a text area from the document image, recognizes first language characters included in the extracted text area, and specifies positions of the first language characters in the document image;
   a translated language character string creating section that creates a translated language character string by translating an original character string which is a first language character string including the first language characters recognized by the character recognizing section, into a second language;
   a translated language character string positioning section that places the translated language character string so as to be in a position which is close to the original character string and in inter-line space between first language character strings in the document image, based on the positions of the first language characters specified by the character recognizing section;
   an image creating section that creates an image of a translated sentence-added document in which the translated language character string is disposed in the document image at the position placed by the translated language character string positioning section;
   a display section that displays the image of the translated sentence-added document created by the image creating section;
   an enlargement display instruction input section that receives an instruction to enlarge and display a part of the image of the translated sentence-added document displayed on the display section;
   a partially-enlarged image creating section that creates a partially-enlarged image in which a part of the image of the translated sentence-added document is enlarged on the basis of the instruction inputted from the enlargement display instruction input section; and
   a control section that controls the image creating section and the display section, the control section controlling the image creating section to create a partial enlargement-added image which is an image obtained by superimposing the partially-enlarged image on the image of the translated sentence-added document, and controlling the display section to display the partial enlargement-added image when the instruction of enlargement display is inputted from the enlargement display instruction input section,
   wherein the partially-enlarged image creating section creates the partially-enlarged image by adding the original character string to the position in the interline space between first language character strings in the image of the translated sentence-added document in an edible state, and
   the control section controls the image creating section to create the partial enlargement-added image by superimposing the partially-enlarged image, to which the original character string is added in an edible state, on the image of the translated sentence-added document and controls the display section to display the partial enlargement-added image.

2. The translation display apparatus of claim 1, wherein the partially-enlargement image creating section creates the partially-enlarged image so that an enlargement factor of an inter-line part in the image of the translated sentence-added document is greater than an enlargement factor of the other part thereof.

3. The translation display apparatus of claim 1, further comprising a correction instruction input section that receives an instruction to correct the original character string which is added to the partially-enlarged image in an editable state,
   the translated language character string creating section creating a new translated language character string by translating the original character string corrected based on the instruction inputted from the correction instruction input section into the second language,
   the partially-enlarged image creating section creating a partially-enlarged image in which the new translated language character string is disposed, and
   the control section controlling the image creating section to create a partial enlargement-added image by superimposing the partially-enlarged image having the new translated language character string disposed therein on the image of the translated sentence-added document, and controlling the display section to display the partial enlargement-added image.

4. A translation display apparatus comprising:
   a document image acquiring section that acquires a document image of a document containing a sentence composed of a plurality of lines in a first language;
   a character recognizing section that extracts a text area from the document image, recognizes first language characters included in the extracted text area, and specifies positions of the first language characters in the document image;
   a translated language character string creating section that creates a translated language character string by translating an original character string which is a first language character string including the first language characters recognized by the character recognizing section, into a second language;
   a translated language character string positioning section that places the translated language character string so as to be in a position which is close to the original character string and in inter-line space between first language character strings in the document image, based on the positions of the first language characters specified by the character recognizing section;
   an image creating section that creates an image of a translated sentence-added document in which the translated language character string is disposed in the document image at the position placed by the translated language character string positioning section;
   a storage section that stores an image of a translated sentence-added document every time the image creating section creates an image of a translated sentence-added document;
   a translated language character string changing area extracting section that compares an image of a translated sentence-added document last stored in the storage section with an image of a translated sentence-added document stored previously thereto and extracts a translated language character string changing area indicating an area in which the translated language character string is different from the image of a translated sentence-added document last stored;
   an emphasized translated language character string creating section that creates an emphasized translated language character string by recognizing a translated language character string included in the translated language character string changing area extracted by the translated language character string changing area extracting section and emphasizing the recognized translated language character string; and a display section that displays an image in which the emphasized translate character string is superimposed on the translated language character string changing area of the image of a translated sentence-added document last stored.

* * * * *